(12) United States Patent
Mistry et al.

(10) Patent No.: US 7,559,455 B2
(45) Date of Patent: Jul. 14, 2009

(54) DIEBOND STRIP

(75) Inventors: Maheshchandr Mistry, Ipswich (GB); Christopher Main, Oxford (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/488,715

(22) Filed: Jul. 18, 2006

(65) Prior Publication Data

US 2006/0255104 A1    Nov. 16, 2006

Related U.S. Application Data

(60) Continuation of application No. 10/833,244, filed on Apr. 27, 2004, now Pat. No. 7,100,815, which is a division of application No. 10/195,057, filed on Jul. 12, 2002, now Pat. No. 6,752,308.

(30) Foreign Application Priority Data

Jul. 12, 2001    (GB) .................................. 0116990.3

(51) Int. Cl.
*B23K 35/12*    (2006.01)
*B23K 31/02*    (2006.01)

(52) U.S. Cl. .................................... 228/246; 228/179.1

(58) Field of Classification Search ................. 228/245, 228/246, 253, 179.1
See application file for complete search history.

(56) References Cited

U.S. PATENT DOCUMENTS

| | | | |
|---|---|---|---|
| 3,778,532 A | 12/1973 | Denver | |
| 4,701,781 A | 10/1987 | Sankhagowit | |
| 4,921,154 A | 5/1990 | Abe et al. | |
| 5,070,718 A | 12/1991 | Thomas | |
| 5,227,572 A | 7/1993 | Cusack et al. | |
| 5,342,999 A | 8/1994 | Frei et al. | |
| 5,454,905 A | 10/1995 | Fogelson | |
| 5,820,014 A * | 10/1998 | Dozier et al. | 228/56.3 |
| 5,896,036 A | 4/1999 | Wood et al. | |
| 6,186,390 B1* | 2/2001 | Tadauchi et al. | 228/56.3 |
| 6,752,308 B2 | 6/2004 | Mistry | |
| 2002/0025606 A1 | 2/2002 | Kurihara et al. | |
| 2002/0172244 A1* | 11/2002 | Li et al. | 372/36 |
| 2003/0010810 A1 | 1/2003 | Mistry et al. | |
| 2003/0047760 A1 | 3/2003 | Daeche et al. | |
| 2003/0064506 A1 | 4/2003 | Vischer | |
| 2005/0051598 A1 | 3/2005 | Heminway et al. | |

FOREIGN PATENT DOCUMENTS

| | | |
|---|---|---|
| GB | 2 149 278 | 5/1985 |
| JP | 590087825 | 11/1982 |
| JP | 60169144 | 2/1984 |
| JP | 63240088 | 3/1987 |
| JP | 03066481 | 2/1991 |
| JP | 2000261085 A * | 9/2000 |

* cited by examiner

*Primary Examiner*—Kevin P Kerns

(57) ABSTRACT

A titanium alloy strip which has a reduced cross section in the central region of the strip. By concentrating heat in this central region the process of bonding laser devices to a substrate is greatly improved. Furthermore, the titanium alloy strip allows for the possibility of removing the laser device from the substrate without destroying the laser device.

15 Claims, 5 Drawing Sheets

DIEBOND STRIP

CROSS REFERENCE TO RELATED APPLICATIONS

The present application is a continuation patent application of U.S. patent application Ser. No. 10/833,244, filed on Apr. 27, 2004, (now U.S. Pat. No. 7,100,815, which issued on Sep. 5, 2006) which is a Divisional Application of U.S. patent application Ser. No. 10/195,057, filed on Jul. 12, 2002 (now U.S. Pat. No. 6,752,308, which issued on Jun. 22, 2004). This application hereby claims priority of United Kingdom Patent Application No. 0116990.3, filed on Jul. 12, 2001, U.S. patent application Ser. No. 10/195,057, filed on Jul. 12, 2002, which is incorporated by reference in its entirety, and U.S. patent application Ser. No. 10/833,244, filed on Apr. 27, 2004, which is incorporated by reference in its entirety.

FIELD OF THE INVENTION

The present disclosure relates to an improved diebond strip. More specifically, the present disclosure relates to a Titanium alloy diebond strip which can be used to both attach and remove a laser die from a substrate.

BACKGROUND OF THE INVENTION

A known diebond strip is shown in FIGS. 1 and 2. The strip 5 is typically an elongated rectangular shaped thin piece of graphite with a centrally located hole 20 and two further holes 22, 24 located at opposite edges of the strip. The diebond strip is typically 1 mm thick approximately 15 mm wide and 54 mm long. Typically a component to be attached to a substrate is placed over central hole 20 and held in place with vacuum pressure. The component is placed on the substrate using various known designs of ceramic tooling attached around the strip. The strip is heated by connecting a low voltage, high current supply to holes 22 and 24. These holes also function as a means of retaining the strip in place during the diebond process.

Currently, semiconductor laser die are mounted to a substrate by heating up an assembly in order to re-flow a preform of solder and allow the semiconductor laser die to be attached to the substrate. This process generates heat by passing a low voltage, high current supply along the die bond strip. With reference to FIG. 3, the semiconductor laser die 1, also know as a chip, is attached to a submount 2. The entire assembly 10 is heated via graphite strip 5 to a point where the solder preform 4 between the submount and the substrate reflows and attaches the chip-on-submount 2 to the substrate 3. However, a technical problem exists with this known process in that the temperature must not be sufficient to compromise the joint between the chip and its submount. Thus, accurate and consistent temperature control is required.

Current methods of attaching the chip-on-submount to the substrate do not use any active control on the graphite diebond strip. Instead, the system uses thermocouples 31, 32 as seen in FIG. 4, and periodically checks to ensure the temperature remains within set parameters.

Another technical problem associated with the current system is maintaining the contact between the thermocouple and the diebond strip, as the thermocouple cannot be attached reliably to the diebond strip. The position and contact of the thermocouple are maintained by using springs 33, 34. As a result, the control is based on the perceived temperature at the junction of the strip and thermocouple. Any variation in this junction can result in a variation of as much as 50° C., without any apparent change in the system.

Furthermore, the current system incorporates a parallel thermocouple system. Thus, if both thermocouples showed similar results, the system is considered to be "in balance" and ready for use. Any imbalance between the two thermocouples required the system to be re-balanced.

Yet another technical problem associated with the current diebond strip is that, due to the nature of graphite, it is difficult to press a thermocouple against the strip without the strip being flexed in some way. This reduces the effectiveness of the vacuum for the retention of the substrate on the strip, and compromises the transfer of heat energy from the strip to the substrate. Pressing the thermocouple against the strip also reduces efficiency of the thermocouple.

In addition, from the first time that the graphite strip is used, the strip begins to deteriorate. This is partially due to the processing of parts on the strip and causes an increase in the resistance of the strip. As the strip's effectiveness is reduced, and the process time gradually increases. This can be slightly compensated for by increasing the power to the strip. However, the current diebond strip must still be replaced approximately every 3 months.

It is an object of the present disclosure to overcome or at least mitigate the above mentioned technical problems.

SUMMARY OF THE INVENTION

According to the present disclosure there is provided a strip for use in diebonding a component to a substrate, the strip comprising a central region having a reduced cross section compared to extremities of the strip.

The strip may have a stepped cross section. Alternatively, the strip may have a tapered cross section.

The strip is preferably made of an alloy, such as titanium alloy.

According to the present disclosure, there is also provided a method for bonding a component to a substrate using a strip comprising a central region having a reduced cross section compared to the extremities of the strip, the method comprising the steps of disposing the substrate proximate the central region of the strip, disposing the component on the substrate, heating the strip to a predetermined temperature sufficient to cause solder disposed between the component and the substrate to reflow, and cooling the strip thereby causing said solder to bond the component to the substrate.

According to the present disclosure, there is also provided a method for removing a component bond to a substrate using a strip comprising a central region having a reduced cross section compared to the extremities of the strip, the method comprising the steps of disposing the substrate having the component bonded thereto proximate the central region of the strip, heating the strip to a predetermined temperature sufficient to cause solder disposed between the component and the substrate to reflow and break the bond, and removing the component from the substrate.

BRIEF DESCRIPTION OF THE DRAWINGS

While the principle advantages and features of the invention have been described above, a greater understanding and appreciation of the invention may be obtained by referring to the drawings and detailed description of a preferred embodiments, presented by way of example only, in which.

DETAILED DESCRIPTION OF THE PREFERRED EMBODIMENT

Figure 5:
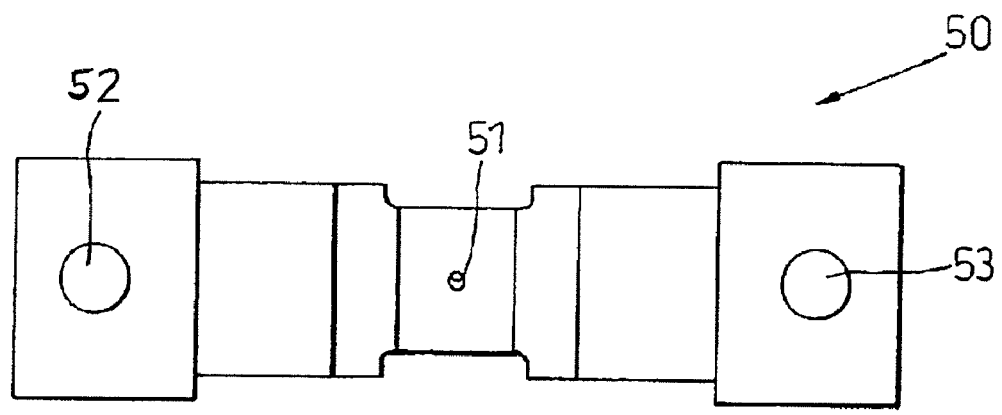
FIG. 5 shows a top view of the diebond strip according to a preferred embodiment of the present disclosure.

In FIG. 5 the diebond strip 50 is shown comprising a centrally located hole 51 to which a vacuum can be applied to temporarily hold a substrate in place. Electrical connection is made to the strip at electrical connection points 52, 53. As in the prior art, these points also function as a means for retaining the strip in place during processing. The strip is preferably made of an alloy and most preferably made of Titanium alloy. The strip is heated by passing electrical current through the strip in much the same manner as with known graphite strips.

Figure 6:
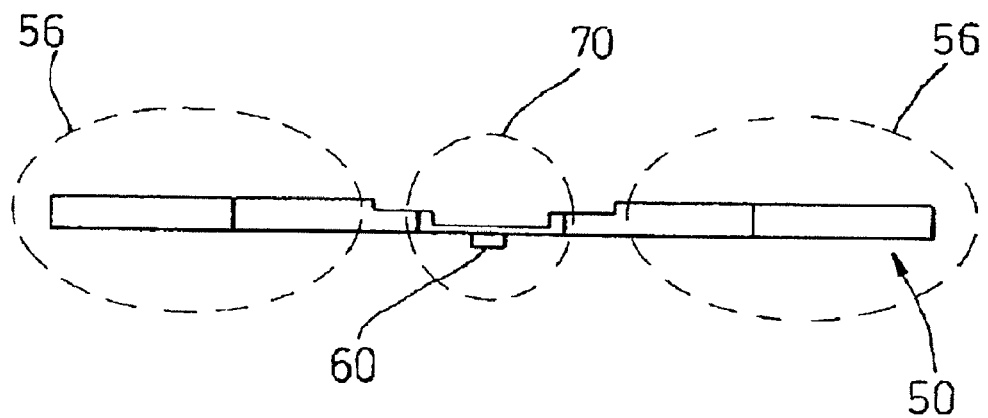
FIG. 6 shows a side view of the strip shown in FIG. 5.

However, as can be clearly seen in FIG. 6, the diebond strip according to the present disclosure has a reduced cross section at the central region 70 of the strip then at the edge region 56. This cross sectional reduction leads to an increase in the resistance of the strip, and consequently, and increase in the temperature for a given power supply.

Located at the center of the strip is a thermocouple 60. The thermocouple is preferably welded to the strip. The weld is used, rather then a spring contact, as it allows for more accurate reading of the temperature of the strip due to an improved and more permanent contact being made between the strip and the thermocouple. As a result, better control of the system is achieved.

Figure 1:
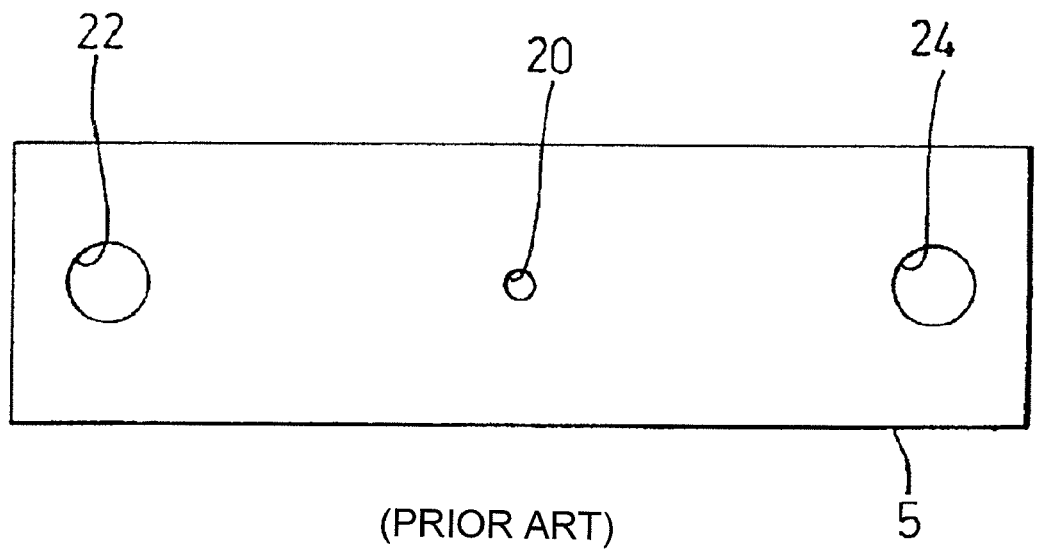
FIG. 1 is a top planar view of a diebond strip according to the prior art.
Figure 2:
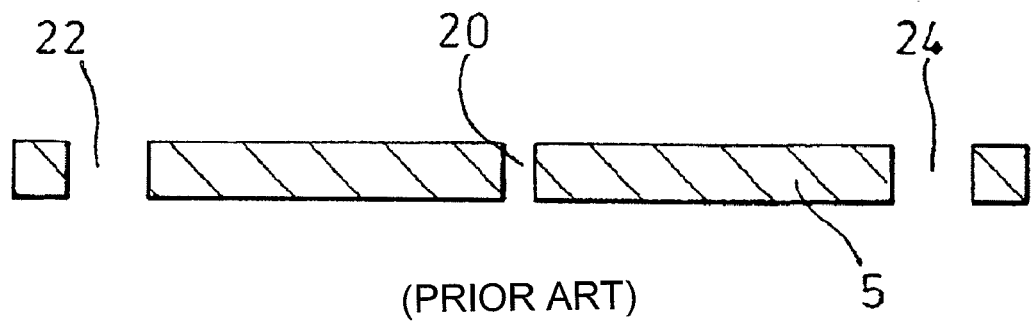
FIG. 2 is a cross-sectional side view of the diebond strip according to FIG. 1.
Figure 3:
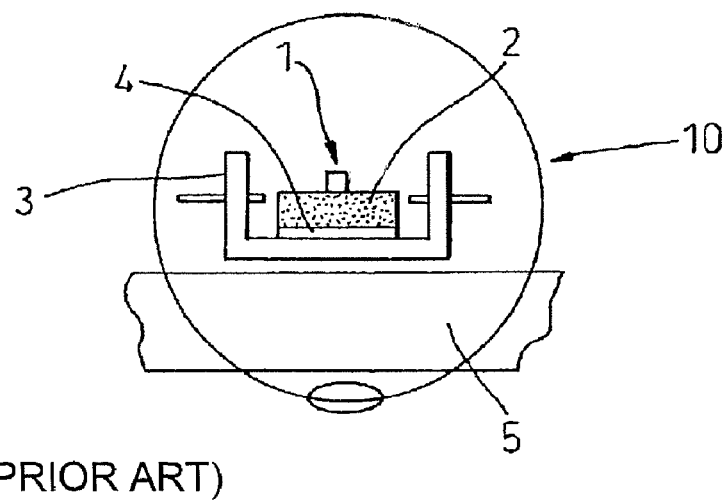
FIG. 3 is a side view of a semiconductor laser die according to the prior art.
Figure 4:
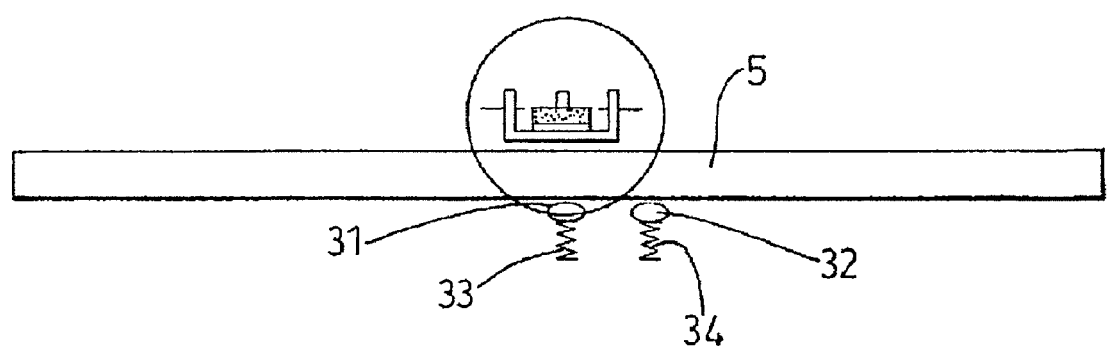
FIG. 4 is a schematic representation of the mounting of the semiconductor laser die according to FIG. 3 to a substrate via thermocouples.
Figure 7:
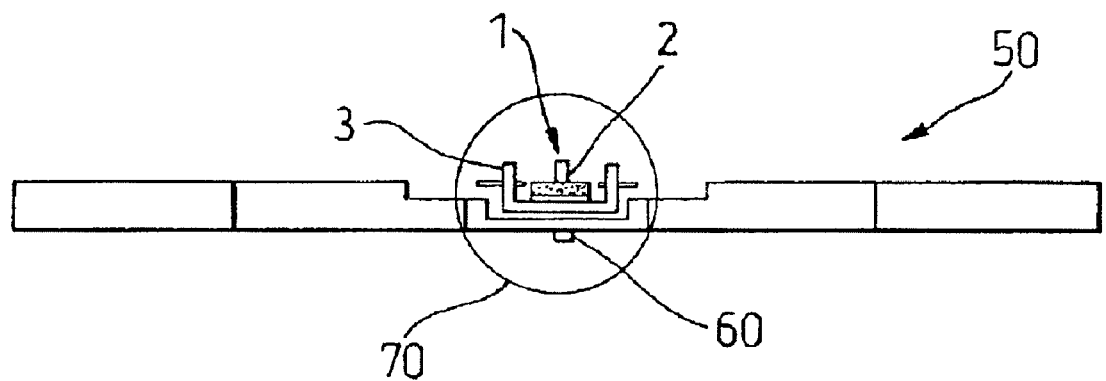
FIG. 7 shows the chip-on-submount and substrate located on the diebond strip shown in FIGS. 5 and 6.
Figure 8:
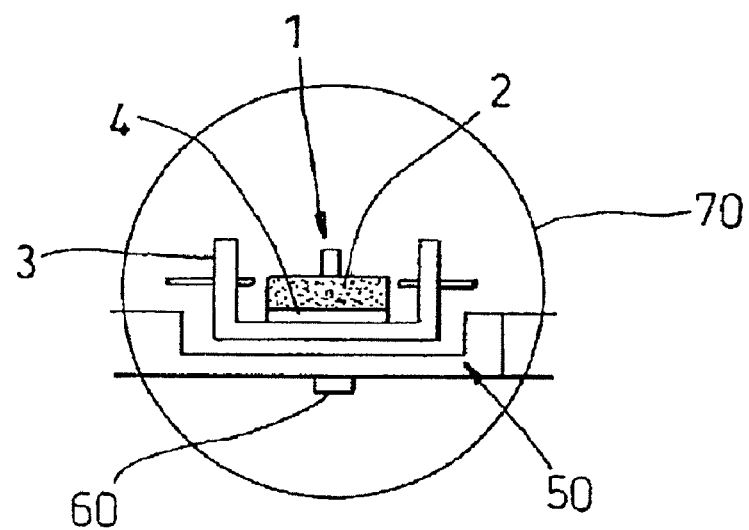
FIG. 8 shows a more detailed view of FIG. 7.

As shown in FIGS. 7 and 8, this central region of the strip labeled 70 is where the chip-on-submount and substrate are located. The chip on submount and substrate are essentially the same as those used in the prior art and shown in FIGS. 3 and 4 above. Thus parts appearing in FIGS. 7 and 8 which also appear in FIGS. 3 and 4 bear identical numerical designation.

Advantageously, heat applied to the diebond strip according to the present disclosure is now concentrated in the central area 70 and is not distributed throughout the strip, thus increasing the efficiency of the strip. The diebond strip according to the present disclosure does not have a complex setup, as was associated with the known graphite strip. Thus better confidence can be placed in the control loop to maintain the required temperatures.

Furthermore, Titanium is hard wearing material. Thus, whereas the graphite strip typically lasts a few months, the Titanium diebond strip will last years.

The Titanium strip has a faster response than the graphite strip. This allows for a reduced process time, as the strip does not take as long to reach temperature and, as a result, will heat the substrate to soldering temperatures in a fraction of the time than was possible with the previously known strip. Thus, advantageously, less power is required to run the strip at the required temperatures.

The stepped design of the present disclosure allows for a variation in the resistance along the strip. This allows the extremities of the strip to remain comparatively cool, and the central "working" area 70 to be running at the required temperature.

The system setup is simplified due to the use of only one thermocouple. This means that greater confidence can be placed on the measured temperature, and consequently, greater control, and stability can be expected from the process.

The thermocouple 60 is spot welded to the strip as opposed to being held in place by spring pressure, meaning greater confidence can be placed in the displayed temperature. Also, by welding the thermocouple in place, the thermocouple does not deform the strip.

Preferably, the strip is wire EDM (Electro-Discharge Machining) machined, and is produced with no curvature. This results in good contact being made between the substrate 3 and the strip 50 yielding better thermal conduction, and retention by the vacuum.

Figure 9:
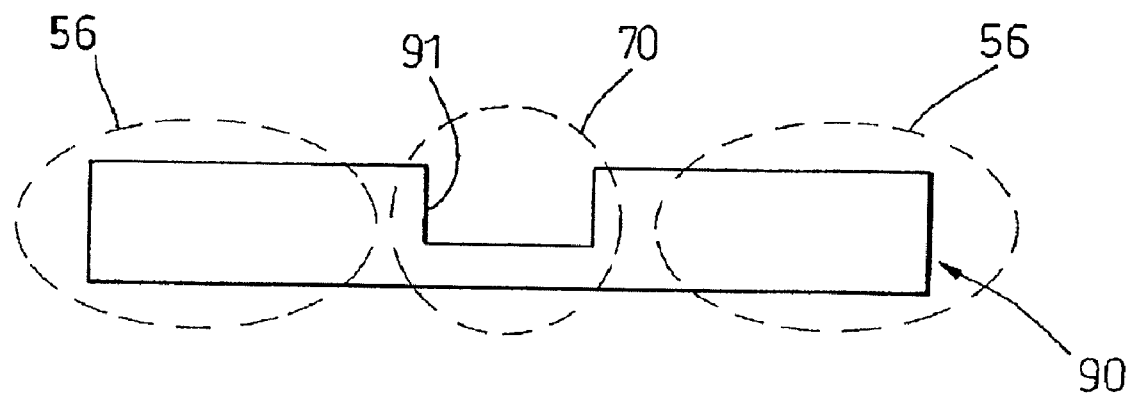
FIG. 9 shows an alternative embodiment of the present disclosure.

FIG. 9 shows an alternative to the stepped strip design shown in the preferred embodiment. Here the diebond strip 90 only has a single step 91 from the thicker edge region 56 to the thinner central region 70.

Figure 10:
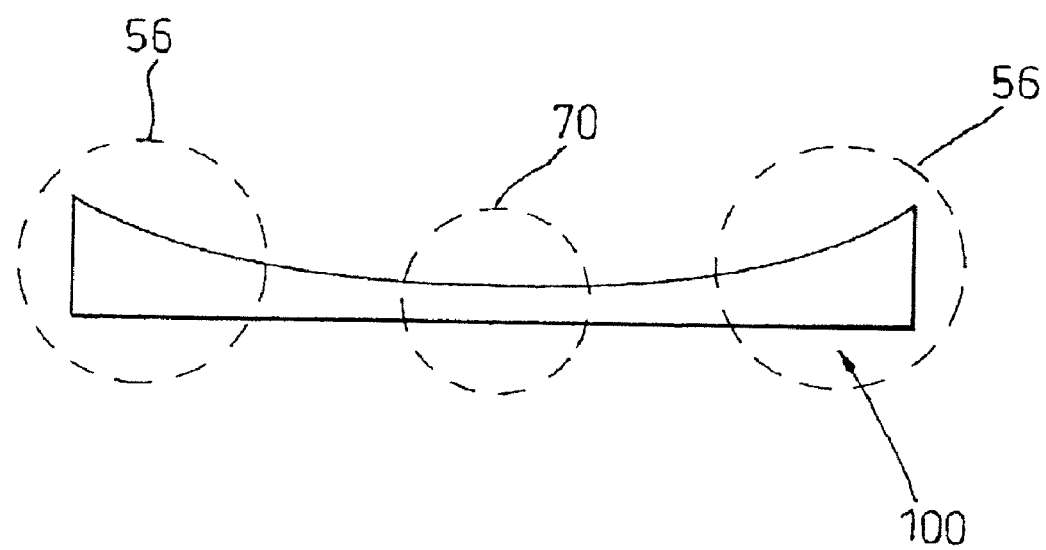
FIG. 10 shows yet another alternative embodiment of the present disclosure.

FIG. 10 shows yet a further alternative, in which the diebond strip 100 is tapered from the thicker edge region 56 towards the thinner central region 70.

Due to an increase in the control and reliability of the strip, a new process has been developed. The diebond strip according to the above described embodiments allows not only a better method of placing the components onto a substrate, but also for a method of removing a component already bonded to a substrate.

Thus, a laser chip can be removed from the substrate using the diebond strip according to the present disclosure. Currently production yield rate for mounting a chip-on-submount to a substrate is low. This low yield is due to a variety of factors including laser chip failure and problems with other components in the final assembly. It is desirable to be able to reclaim any functioning components from the failed assembly and reuse them in another assembly. Thus, the ability to reclaim laser chips or other components which are still functional from a failed assembly can result in a significant production cost savings.

It is not intended that the present disclosure be limited to the above embodiments and other modifications and variations are envisaged within the scope of the claims.

What is claimed is:

1. A method for bonding a component to a substrate, said method comprising the steps of:
   configuring a strip for use in diebonding a component to a substrate, the strip comprising a central region having a reduced cross-section and a centrally located hole,
   attaching by bonding a sensor proximal to the central region,
   disposing the substrate proximate the central region of the strip so that the substrate contacts the central region and is positioned over the centrally located hole,
   disposing the component on the substrate,
   heating the strip to a predetermined temperature sufficient to cause solder disposed between the component and the substrate to reflow,
   cooling the strip thereby causing said solder to bond the component to the substrate, and
   removing the component bonded to the substrate from the strip.

2. A method as claimed in claim 1, wherein the component is an optoelectrical device.

3. A method as claimed in claim 2, wherein the optoelectrical device is a semiconductor laser.

4. A method as claimed in claim 1, further comprising removably securing the substrate to the central region of the strip with vacuum suction.

5. A method as claimed in claim 1, further comprising using the sensor to measure an environmental parameter.

6. A method as claimed in claim 5, wherein the environmental parameter comprises temperature.

7. A method as claimed in claim 5, further comprising controlling a heat source in response to the sensor.

8. A method as claimed in claim 1, wherein attaching the sensor comprises welding.

9. A method as claimed in claim 1, wherein configuring the strip comprises machining a substantially planar mounting surface across the central region.

10. A method as claimed in claim 1, wherein configuring the strip comprises configuring a single step from respective edge regions to the central region.

11. A method as claimed in claim 10, wherein configuring the single step from respective edge regions to the central region further comprises configuring a surface that is substantially orthogonal to a mounting surface in the central region.

12. A method as claimed in claim 1, wherein configuring the strip comprises configuring an intermediate step between respective edge regions and the central region.

13. A method as claimed in claim 12, wherein configuring the intermediate step between respective edge regions and the central region further comprises configuring multiple surfaces that are substantially orthogonal to a mounting surface in the central region.

14. A method as claimed in claim 1, wherein configuring the strip further comprises reducing the cross-section in the central region along a dimension substantially orthogonal to a mounting surface.

15. A method as claimed in claim 14, wherein configuring the strip further comprises configuring an intermediate step between respective edge regions and the central region and reducing the cross-section in the central region along a dimension substantially orthogonal to a mounting surface and to a surface of the intermediate step.

* * * * *